United States Patent
Iganami

(10) Patent No.: US 6,556,626 B1
(45) Date of Patent: Apr. 29, 2003

(54) MPEG DECODER, MPEG SYSTEM DECODER AND MPEG VIDEO DECODER

(75) Inventor: Chiho Iganami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/503,950

(22) Filed: Feb. 14, 2000

(30) Foreign Application Priority Data

Feb. 17, 1999 (JP) .......................................... 11-039273

(51) Int. Cl.[7] .................................................. H04N 7/12
(52) U.S. Cl. ................................................. 375/240.25
(58) Field of Search ........................ 386/95, 124, 109, 386/110, 111, 112, 98, 71; 348/423.1; 375/240, 240.01, 240.25, 240.26, 240.28; H04N 7/12

(56) References Cited

U.S. PATENT DOCUMENTS

| | | | | |
|---|---|---|---|---|
| 5,566,089 A | * | 10/1996 | Hoogenboom | 358/1.15 |
| 5,764,658 A | * | 6/1998 | Sekiguchi et al. | 714/752 |
| 5,812,201 A | * | 9/1998 | Yoo | 348/423.1 |
| 6,334,026 B1 | * | 12/2001 | Xue et al. | 386/98 |
| 6,377,748 B1 | * | 4/2002 | Schultz et al. | 386/124 |

FOREIGN PATENT DOCUMENTS

| | | | |
|---|---|---|---|
| JP | 8-212701 | 8/1996 | G11B/20/10 |
| JP | 10-98699 | 4/1998 | H04N/7/08 |

* cited by examiner

*Primary Examiner*—Nhon Diep
(74) *Attorney, Agent, or Firm*—Hayes Soloway PC

(57) ABSTRACT

An MPEG decoder is provided which is capable of performing processing of all PTS/DTS values even if data with the PTS/DTS values added is contained consecutively in a system stream. The MPEG decoder is adapted to replace a start code ID of data with the PTS/DTS values added in a video elementary stream with a unused start code ID of a video layer and which includes a system decoder used to hold the PTS/DTS values and the unused start code ID value, a memory controller used to store the video elementary stream into a memory, to read and to output it and a video decoder used to detect the fact that the start code ID has the unused start code ID at the time of starting to decode the video elementary stream and to issue an instruction of interruption to occur to a processing device and to output images obtained from the decoding in accordance with the instruction from the processing device based on the interruption.

10 Claims, 5 Drawing Sheets

MPEG DECODER, MPEG SYSTEM DECODER AND MPEG VIDEO DECODER

BACKGROUND OF THE INVENTION

1. Field of the Invention

The present invention relates to MPEG (Moving Picture Experts Group) decoding technology and more particularly to an MPEG decoder, MPEG system decoder and MPEG video decoder which are capable of decreasing the number of circuits required for processing of PTS (Presentation Time Stamp) / DTS (Decoding Time Stamp) values.

2. Description of the Related Art

In an MPEG system, time division multiplexing of an MPEG video stream obtained by encoding image data and an MPEG audio stream obtained by encoding audio data is performed by a sender to form an MPEG system stream for transmission and each of the MPEG video streams and the MPEG audio streams is decoded by a receiver separately to reproduce its original image data and its original audio data. At this point, since the image data and audio data are transmitted in a compressed state, the sender transmits time information about its original data at the same time and then the receiver reconstructs time information of the original data using the above time information and standard time transmitted by the sender to decode and reproduce the image and audio data for outputting.

FIGS. 5A, 5B and 5C are diagrams showing structures of such MPEG data. The MPEG data is hierarchially structured. A top hierarchy is composed of a system layer. A PES (Packetized Elementary Stream) packet obtained by packetizing video data and a PES packet obtained by packetizing audio data being mixed constitutes the system stream as shown in FIG. 5A. Also, as shown in FIG. 5A, the PES packet is composed of a system header and packet data obtained by packetizing video or audio data. The system header is comprised of 4-byte codes including a head starting code having a fixed value (24 bits), a 8-bit start code ID showing a type of data and PTS/DTS values being time information.

The PTS (Presentation Time Stamp) is information used to manage time for outputting the reproduced MPEG image, while the DTS (Decoding Time Stamp) is information used to manage time for starting to decode image data. The MPEG decoder, after adjusting time for reproducing and decoding image by comparing an STC (System Time Clock) value, which is reference time in the MPEG decoder, with the PTS/DTS values, is adapted to perform AV (Audio Visual) synchronization adjustment so as to synchronize image reproducing output to voice reproducing output. The PTS/DTS values are inserted singly or together at an interval of a relatively long time when necessary. Moreover, the PTS/DTS values are inserted both in the case of an MPEG1 system in which a picture is corresponded to a frame of a reproduced image and in the case of an MPEG2-PS system in which the picture is corresponded to the frame or field of the reproduced image.

In the MPEG decoder, each of a video ES (Elementary Stream) and an audio ES is separated from the system layer for processing. The video: ES is formed with video packet data strings in the system stream as shown in FIG. 5B. A plurality of the packet data in the video ES constitutes one picture and picture data contains a plurality of pictures as shown in FIG. 5C. For example, a picture 1 is composed of packet data 1, packet data 2, . . . , N−1, and a picture 2 is composed of packet data N, N+1, . . . . The picture data contains a head starting code composed of a fixed value (24 bits) and 8bit start code ID showing a type of data.

According to specifications of the MPEG system, "00 to B8" (in hexadecimal) are used as a start code ID of data in each layer described above to be inserted in the video ES and "BA to FF" (in hexadecimal) are used as the start code ID of data in each layer to be inserted in the system stream.

FIG. 6 is a schematic block diagram showing configurations of the conventional MPEG decoder. Operations of the conventional MPEG decoder are hereafter described.

A system decoder 1, when receiving a system stream, decodes a system layer, detects PTS/DTS values and then stores them into a PTS/DTS register $1_1$.

The system decoder 1 is used to output a video stream obtained by decoding the system stream and by separating it. If the video stream is data with the PTS/DTS values added, the system decoder 1 outputs a DTS flag. A memory controller 2 is adapted to store the video stream fed by the system decoder 1 into a memory 3 and, if the existence of a PTS flag is detected, holds an address of data with the PTS added in a PTS/DTS data address register $2_1$.

The memory controller 2, when a video decoder 4 becomes processable, reads the video stream from the memory 3 and outputs it to the video decoder 4 and, if the video stream is data with PTS/DTS values added, outputs the PTS flag to the video decoder 4.

The video decoder 4 is adapted to decode the inputted video stream. At this point, if the existence of the PTS flag is detected, the video decoder 4 informs a CPU (Central Processing Unit) 5 that it has read data with the PTS/DTS values added, by outputting the PTS flag to the CPU 5. The CPU 5, when receiving the PTS flag, checks the address register $2_1$ storing data with the PTS/DTS values added and, at the same time, outputs an instruction to clear the PTS/DTS values held by the PTS/DTS register $1_1$ to the system decoder 1.

The CPU 5 in the MPEG decoder, by comparing an STC value, which is reference time information fed by an STC section 6, with the PTS/DTS values stored in the PTS/DTS register $1_1$, generates an image reproducing output based on decoded video data in accordance with the reference time. For example, if there is a delay or an advance in outputting a reproduced voice and in outputting a reproduced image, the AV (Audio-Visual) synchronization processing is performed by a method employing a deletion (or a skipping process) for every picture or a repetition (i.e., a repeating process) of outputting or by a similar method to synchronize the separately decoded voice reproducing output to the image reproducing output.

In the conventional MPEG decoder as shown in FIG. 6, during a period while the system decoder 1 is performing processing of the PTS/DTS values stored in the PTS/DTS register $1_1$, if newly inputted video stream is data with the PTS/DTS values added, it cannot be processed and must be discarded accordingly. It is impossible to completely process all of the PTS/DTS values, making it difficult to perform the AV synchronization satisfactorily.

In Japanese Laid-open Patent Application No. Hei8-212701, a method is disclosed in which a plurality of PTS values separated from a video stream is sequentially accumulated in a register as a combination with an address and, when the video stream is supplied to a decoding section, the fact is detected, by comparing an address of the video stream with an address read from the registers that the data is one with the PTS value added and by associating the PTS value with a picture, decoding is performed by the skipping or repeating processing.

Moreover, in Japanese Laid-open Patent Application No. Hei10-98699, a method is disclosed in which, by inserting PTS data into an arbitrary detectable position within a data stream such as a video ES or the like and by transferring it to a decoder, fact is detected by a decoder that data is one with the PTS value added.

As described above, the conventional MPEG decoder as shown in FIG. 6 has a problem in that the MPEG decoder, when receiving the input system stream, cannot carry out the processing of the PTS/DTS values if data with the PTS/DTS values added is consecutively contained in the system stream On the other hand, according to the method disclosed in the above Japanese Laid-open Patent Application No. Hei8-212701, though the processing can be performed with all the PTS data stacked, when the decoding is. performed, the processing must be done after confirming a conformity detected by comparing an address of the PTS value read from the register with an address of the video stream, thus causing the structure of required circuits to be complicated and further an amount of hardware to be increased.

Furthermore, according to the method disclosed in the above Japanese Laid-open Patent Application No. Hei10-98699, since the PTS data is inserted into the data stream and is inputted into the video decoder, though all PTS data can be processed, the vide decoder must perform the processing of detection of the PTS data inserted into the data stream, thus causing the decoding processing to be complicated.

SUMMARY OF THE INVENTION

In view of the above, it is an object of the present invention to provide an MPEG decoder which is capable of processing even if an inputted system stream contains consecutive data with PTS/DTS values added and of easily performing PTS/DTS processing and which can be constructed by decreased numbers of circuits required for the PTS/DTS processing.

According to a first aspect of the present invention, there is provided the MPEG decoder including:

a system decoder to separate a video elementary stream from a system stream, to replace a start code ID of picture data with PTS/DTS (Presentation Time Stamp/Decoding Time Stamp) values added in the video elementary stream with a start code ID being unused in a video layer and to output it, said system decoder to hold the PTS/DTS values and the unused start code ID value as an index;

a memory controller to store the video elementary stream fed from the system decoder into a memory; and a video decoder to issue an instruction of an interruption to a processing device when detecting a fact that the start code ID in the video elementary stream has the unused start code ID at the time of decoding the video elementary stream from the memory controller and to output images obtained by the decoding in accordance with said instruction from the processing device based on the interruption.

In the foregoing, a preferable mode is one wherein the video decoder, when detecting the unused start code ID, issues the instruction of the interruption and outputs the unused start code ID to the processing device and the processing device, in response to the interruption, reads the PTS/DTS values from the system decoder using the unused start code ID as an index and performs processing the PTS/DTS values.

Also, a preferable mode is one wherein the start code ID being unused in the video layer has a value selected out of start code ID values in the system stream.

Also, a preferable mode is one wherein the memory controller, when the video decoder is in a state to be able to perform processing of the video elementary stream, reads the video elementary stream from the memory and outputs it to the video decoder.

Also, a preferable mode is one wherein the processing device, when receiving the instruction of the interruption, by reading the PTS/DTS values having the unused start code ID value as the index from the system decoder and by comparing the PTS/DTS values with an STC value, issues an instruction to the video decoder for outputting images.

Furthermore, a preferable mode is one wherein the instruction to output the images is one to skip or repeat outputting of the images if there is a delay or an advance in reproducing images relative to reference time.

According to a second aspect of the present invention, there is provided an MPEG decoder wherein PTS/DTS values in an inputted system stream are detected and a start code ID is outputted after the start code ID of a picture with the PTS/DTS values added is replaced with a start code ID being unused in a video layer.

In the foregoing, it is preferable that the start code ID being unused in the video layer has a value selected out of start code ID values in a system stream.

According to a third aspect of the present invention, there is provided an MPEG decoder wherein, when a start code ID being unused in a video layer is detected in an inputted video elementary stream, decoding processing is performed by recognizing that it is a start code ID of picture data with PTS/DTS values added.

In the foregoing, it is preferable that the start code ID being unused in the video layer has a value selected out of start code ID values in a system stream.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
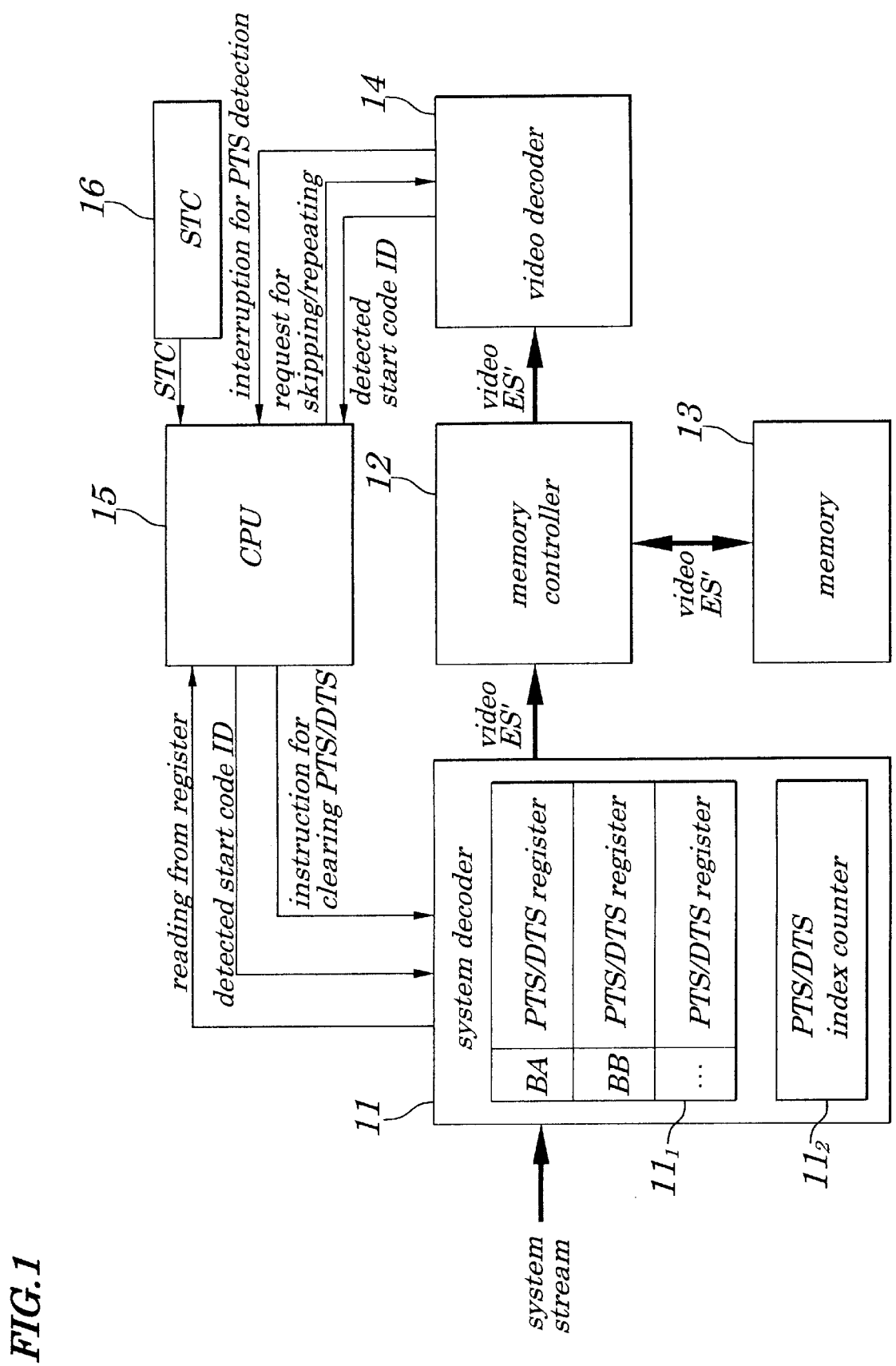
FIG. 1 is a schematic block diagram showing configurations of an MPEG decoder according to an embodiment of the present invention.
Figure 2:
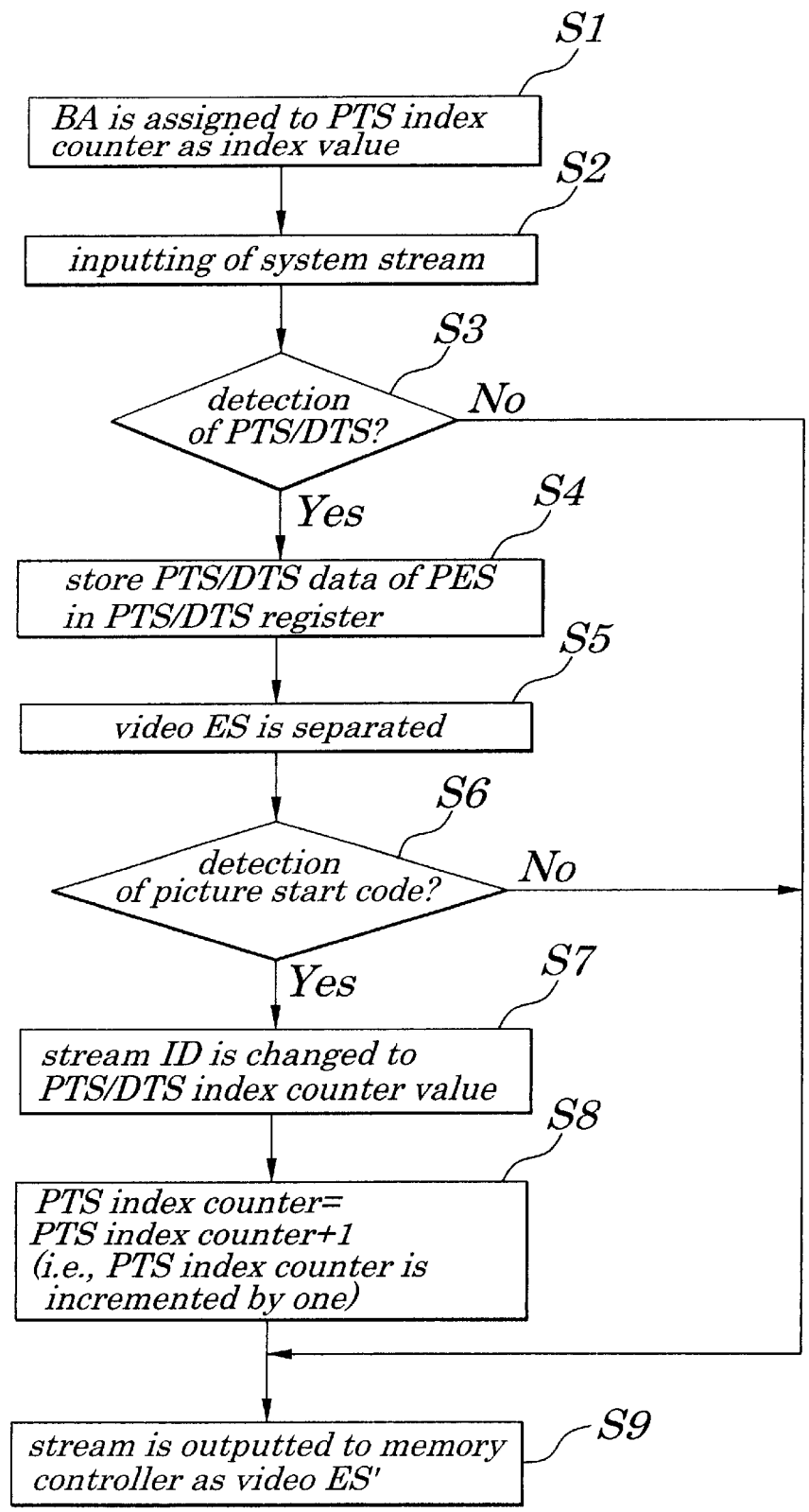
FIG. 2 is a flowchart showing processing of a system decoder of the present invention.
Figure 3:
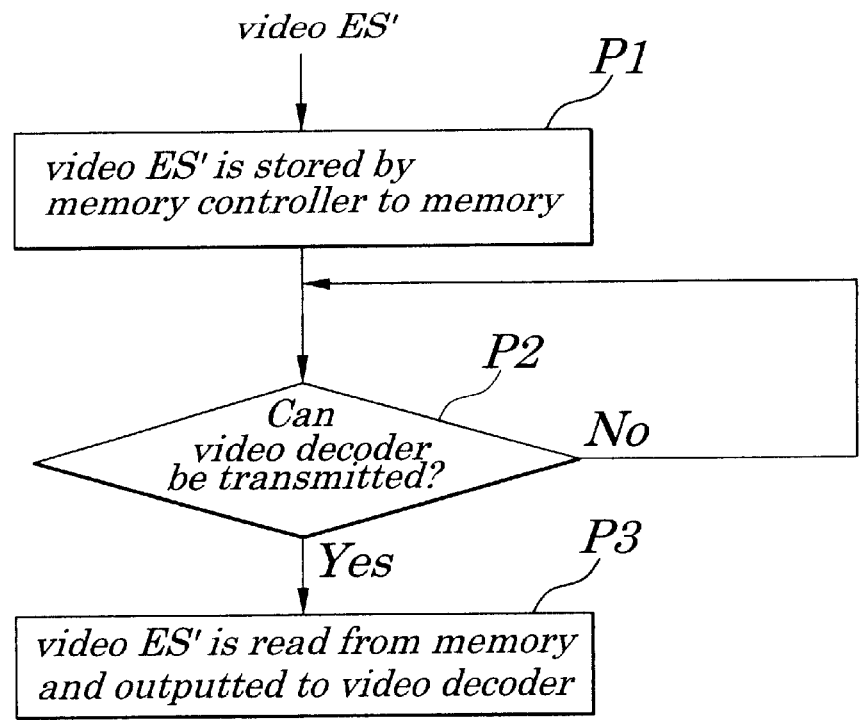
FIG. 3 is a flowchart showing processing of a memory controller of the present invention.
Figure 4:
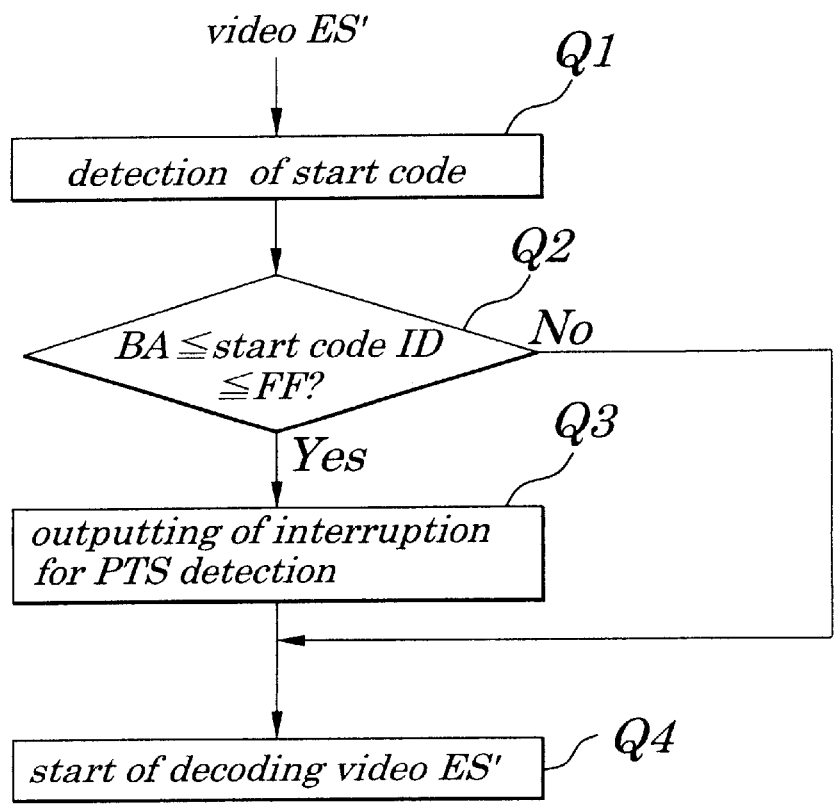
FIG. 4 is a flowchart showing processing of a video decoder of the present invention.

FIG. 1 is a schematic block diagram showing configurations of an MPEG decoder according to an embodiment of the present invention. FIG. 2 is a flowchart showing processing of a system decoder of the present invention. FIG. 3 is a flowchart showing processing of a memory controller of the present invention. FIG. 4 is a flowchart showing processing of a video decoder of the present invention.

As shown in FIG. 1, the MPEG decoder of the embodiment of the present invention is composed of a system decoder 11, memory controller 12, a memory 13, a video decoder 14, a CPU (Central Processing Unit) 15 and an STC (System Time Clock) section 16.

The system decoder 11 is used to decode a system layer, to detect PTS/DTS (Presentation Time Stamp/Decoding Time Stamp) values and to extract a video ES (Elementary Stream) from a system stream and, at a same time, is adapted to rewrite a picture start code ID contained in the video ES corresponding to the detected PTS/DTS;values with a start code ID of the system stream and to output the video ES having a rewritten ID. A PTS/DTS register $11_1$, constituting the system decoder 11 holds a plurality of the PTS/DTS values extracted from a system layer in accordance with an index constructed by a PTS/DTS index counter $11_2$. The PTS/DTS index counter $11_2$ is incremented every time the PTS/DTS values are written to construct an index used in the PTS/DTS register The memory controller 12 is used to store video ES' fed by the system decoder 11 into the memory 13. The memory 13 stores the video ES' containing a plurality of packet data. The video decoder 14 is adapted to decode the inputted video ES', to cause an interruption for detection of the PTS/DTS values to occur when a fact is detected that a picture start code ID of a picture layer has been re-written with a start code ID selected out of start codes of the system stream and to perform processing of deletion of image reproduced output and of repetition of outputting in response to a skipping/repeating request from the CPU 15.

The CPU 15, when receiving the PTS detecting interruption, by reading the PTS/DTS values from the PTS/DTS register $11_1$ and by comparing them with the STC value of the STC section 16, controls outputting of reproduced image and issues an instruction to clear the PTS/DTS register $11_1$. The STC section 16 is used to generate the reference time information STC.

Operations of the MPEG decoder are hereinafter described by referring to FIGS. 1 to 4.

Figure 5:
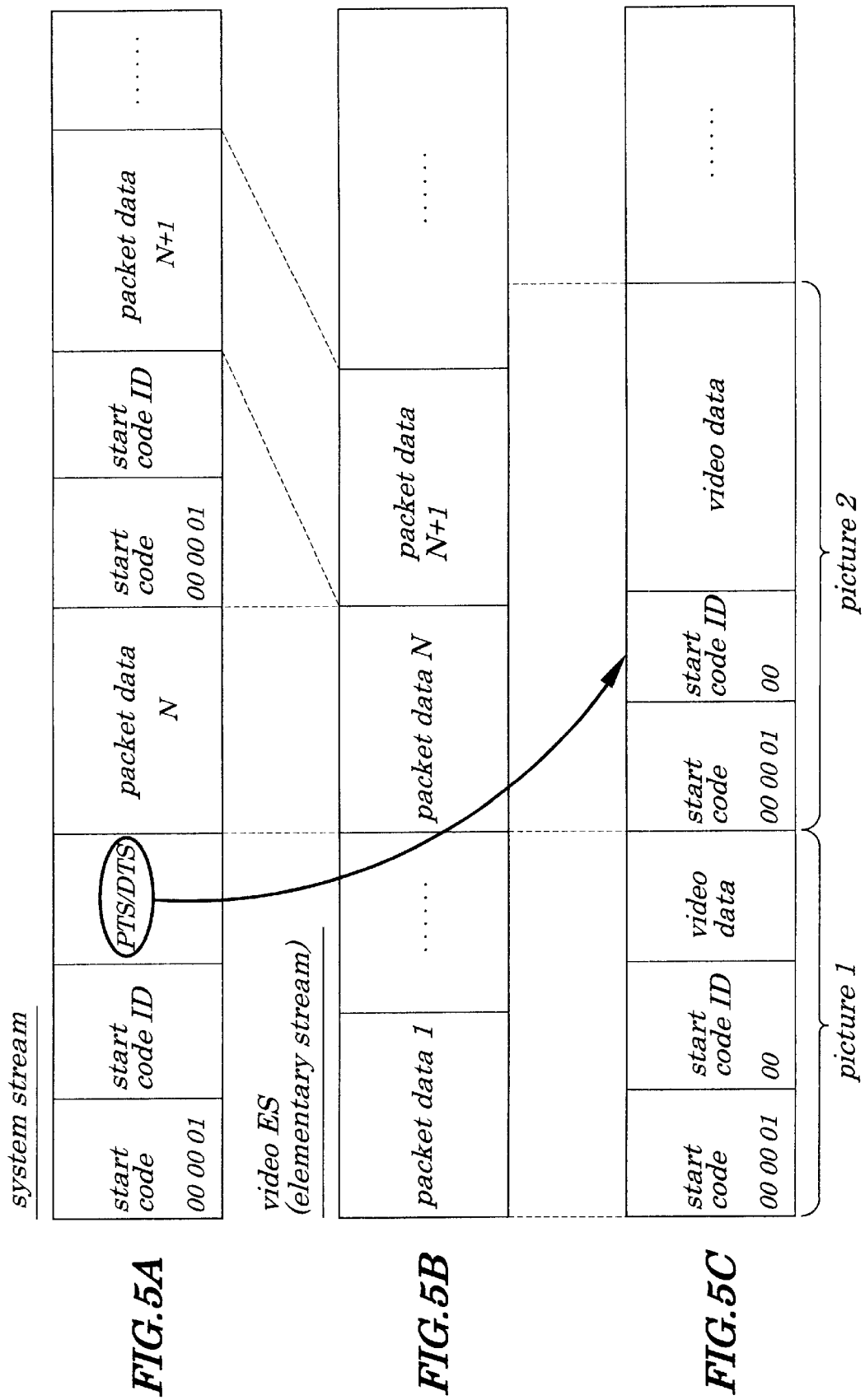
FIGS. 5A, 5B and 5C are diagrams showing structures of MPEG data of the present invention.
Figure 6:
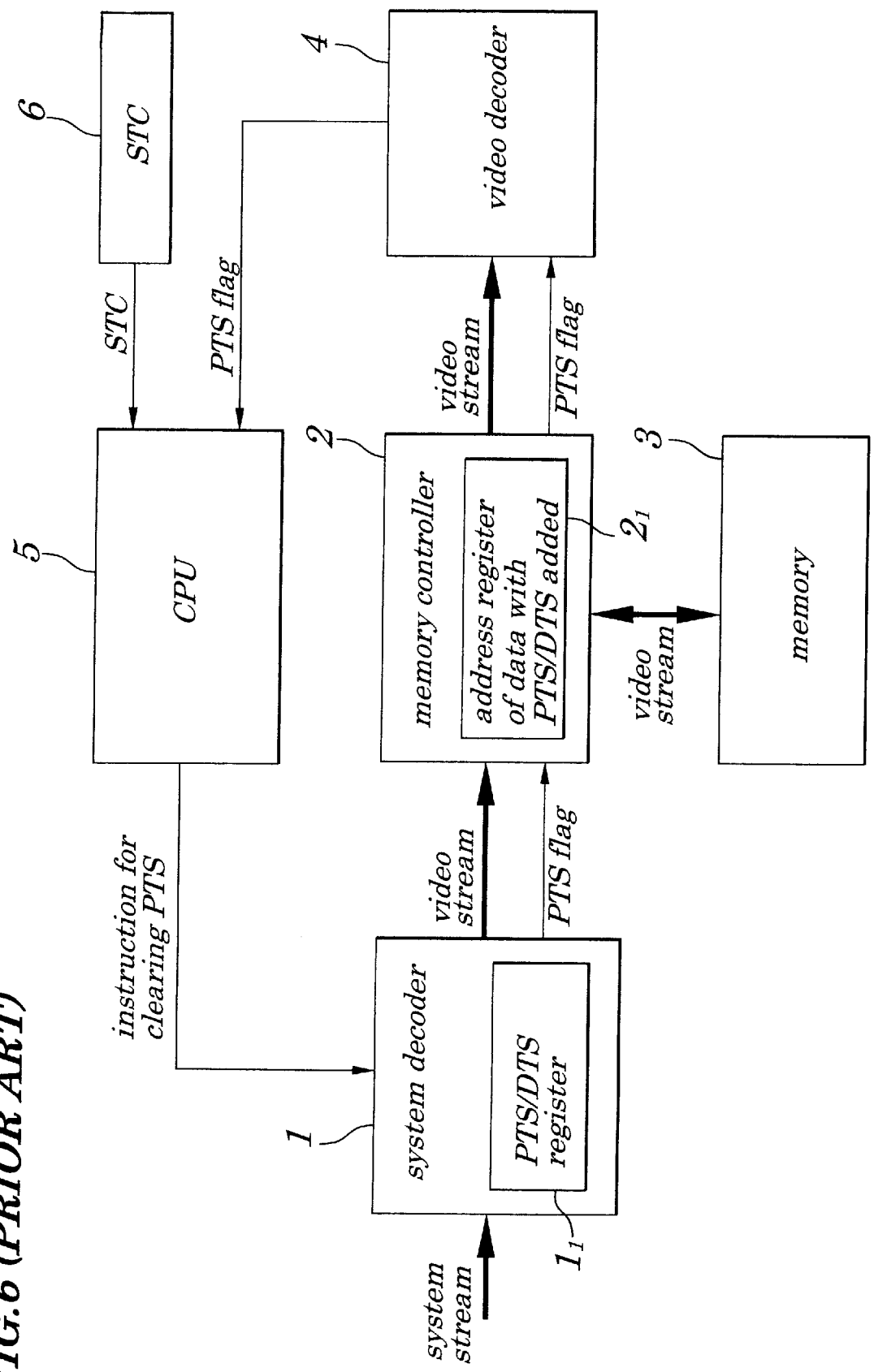
FIG. 6 is a schematic block diagram showing configurations of a conventional MPEG decoder.

The system decoder 11 is operated to input the system stream into a PTS/DTS index counter with "BA" assigned as an index value (Steps S1 and S2). If the video PES packet with the PTS/DTS values added is detected in the inputted system stream, its start code ID is held at a portion having the index BA of the PTS/DTS index counter (Steps S3 and S4). Next, the system decoder 11 separates the video ES from the system stream (Step S5). When a picture start code ID (00) showing picture data is detected from the video ES (Step S6), the picture start code ID of the picture data is changed to the index value (BA) of the PTS/DTS register $11_1$ (Step S7). For example, the PTS/DTS values contained in the system stream in the above FIG. 5A is the PTS/DTS values for the packet data N, N+1, . . . , constituting the picture 2 and therefore the start code ID of the picture 2 in FIG. 5C is replaced with values BA to FF.

Moreover, the PTS/DTS index counter $11_2$ is incremented so that its index value is replaced with "BB" (Step S8) and a stream composed of picture data with the picture start code ID replaced with the index value of the PTS/DTS register $11_1$ is outputted as a video ES' to the memory controller 12 (Step S9). When the video PES packet with the PTS/DTS values added is not detected in the system stream (Step S3) and when the picture start code ID showing the picture data is not detected in the video ES (Step S6), the original stream is outputted as the video ES' to the memory controller 12 (Step S9).

The memory controller 12 is used to store the video ES' fed from the system decoder 11 into the memory 13 (Step P1). The memory controller 12 waits for a state to occur where the video decoder 14 is able to process and where the video ES' is able to be transferred (Step P2), it reads the video ES' from the memory 13 and outputs it to the video decoder 14 (Step P3).

The video decoder 14, when detecting a start code ID in the video ES' fed from the memory controller 12 (Step Q1) and confirms that BA≦start code ID≦FF (Step Q2), outputs an instruction of interruption for detection of the PTS to occur and an index value (unused start code ID value) to the CPU 15 (Step Q3) and starts to decode the video ES' (Step Q4). The video decoder 14, if the detected start code ID has no values described above (Step Q2), does not issue the instruction of interruption for the PTS detection to occur and starts to decode the video ES' (Step Q4).

The CPU 15, when receiving the instruction of the interruption for the PTS detection to occur, reads the PTS/DTS register $11_1$ storing the informed index value (i.e., the unused start code ID) to obtain the PTS/DTS values of the data with the PTS/DTS added and issues an instruction to clear the PTS/DTS register $11_1$, the reading of which is complete.

The CPU 15, by comparing the STC value fed from the STC section with the read PTS/DTS values and in accordance with the reference time, issues image reproducing output based on the decoded video data. Based on this, separately decoded voice reproduced output is synchronized with the image reproduced output and, if there is a delay or an advance between outputting of the reproduced image and outputting of the reproduced voice, by deleting (skipping) the picture or by outputting it repeatedly, the AV synchronization processing is performed.

As described above, in the MPEG decoder according to this embodiment, the video ES is separated by the system decoder from the system stream and the start code ID of the picture data with the PTS/DTS values added in the video ES is replaced with the start code ID being unused in the video layer. The above PTS/DTS values and the above unused start code ID value are held as the index value. The memory controller stores the video ES fed from the system encoder into the memory and reads out and outputs. The video decoder, when detecting the fact that the start code ID in the video ES has the above unused start code ID value at the time of decoding the video ES fed from the memory controller, issues an instruction for interruption to the processing device and, in accordance with the instruction from the processing device based on the interruption, the image obtained from the above decoding is outputted. Therefore, even if the data with the PTS/DTS values added is contained consecutively in the inputted system stream, without discarding the PTS/DTS values, it is made possible to perform processing all of the PTS/DTS values, and further only by detecting the fact that the value of the start code ID falls within a predetermined range, whether the data is one with the PTS/DTS values can be recognized, thus simplifying the processing of the PTS/DTS values, allowing the conventional MPEG decoder to be applied as it is and enabling the number of circuits required for the PTS/DTS processing to be decreased.

It is apparent that the present invention is not limited to the above embodiments but may be changed and modified without departing from the scope and spirit of the invention. For example, the MPEG system stream to be inputted into the MPEG decoder may be one transmitted through a wire or wireless transmission path or one read from such a storage medium as a DVD (Digital Video Disk) or the like.

Finally, the present application claims the priority of Japanese Patent Application No. Hei11-039273 filed on Feb. 17, 1999, which is herein incorporated by reference.

What is claimed is:

1. An MPEG decoder comprising:
   a system decoder to separate a video elementary stream from a system stream, to replace a start code ID of picture data with PTS/DTS (Presentation Time Stamp/Decoding Time Stamp) values added in said video elementary stream with a start code ID being unused in a video layer and to output it, said system decoder to hold said PTS/DTS values and said unused start code ID value as an index;
   a memory controller to store said video elementary stream fed from said system decoder into a memory; and
   a video decoder to issue an instruction of an interruption to a processing device when detecting a fact that said start code ID in said video elementary stream has said unused start code ID at the time of decoding said video elementary stream from said memory controller and to output image obtained by said decoding in accordance with said instruction from said processing device based on said interruption.

2. The MPEG decoder according to claim 1, wherein said video decoder, when detecting said unused start code ID, issues said instruction of said interruption and outputs said unused start code ID to said processing device and said processing device, in response to said interruption, reads said PTS/DTS values from said system decoder using said unused start code ID as an index and performs processing of said PTS/DTS values.

3. The MPEG decoder according to claim 1, wherein said start code ID being unused in said video layer has a value selected out of start code ID values in said system stream.

4. The MPEG decoder according to claim 1, wherein said memory controller, when said video decoder is in a state to be able to perform said video elementary stream, reads said video elementary stream from said memory and outputs it to said video decoder.

5. The MPEG decoder according to claim 1, wherein said processing device, when receiving said instruction of said interruption, by reading said PTS/DTS values having said unused start code ID value as said index from said system decoder and by comparing said PTS/DTS values with an STC value, issues an instruction to said video decoder for outputting images.

6. The MPEG decoder according to claim 5, wherein said instruction to output said images is one to skip or repeat outputting of said images if there is a delay or an advance in reproducing images relative to reference time.

7. An MPEG decoder wherein PTS/DTS values in an inputted system stream are detected and a start code ID is outputted after said start code ID of a picture with said PTS/DTS values added is replaced with a start code ID being unused in a video layer.

8. The MPEG decoder according to claim 7, wherein said start code ID being unused in said video layer has a value selected out of start code ID values in a system stream.

9. An MPEG decoder wherein, when a start code ID being unused in a video layer is detected in an inputted video elementary stream, decoding processing is performed by recognizing that it is a start code ID of picture data with PTS/DTS values added.

10. The MPEG decoder according to claim 9, wherein said start code ID being unused in said video layer has a value selected out of start code ID values in a system stream.

* * * * *